L. S. HUGHES.
PRODUCTION OF LEAD COMPOUNDS.
APPLICATION FILED DEC. 8, 1911.
1,033,405.
Patented July 23, 1912.
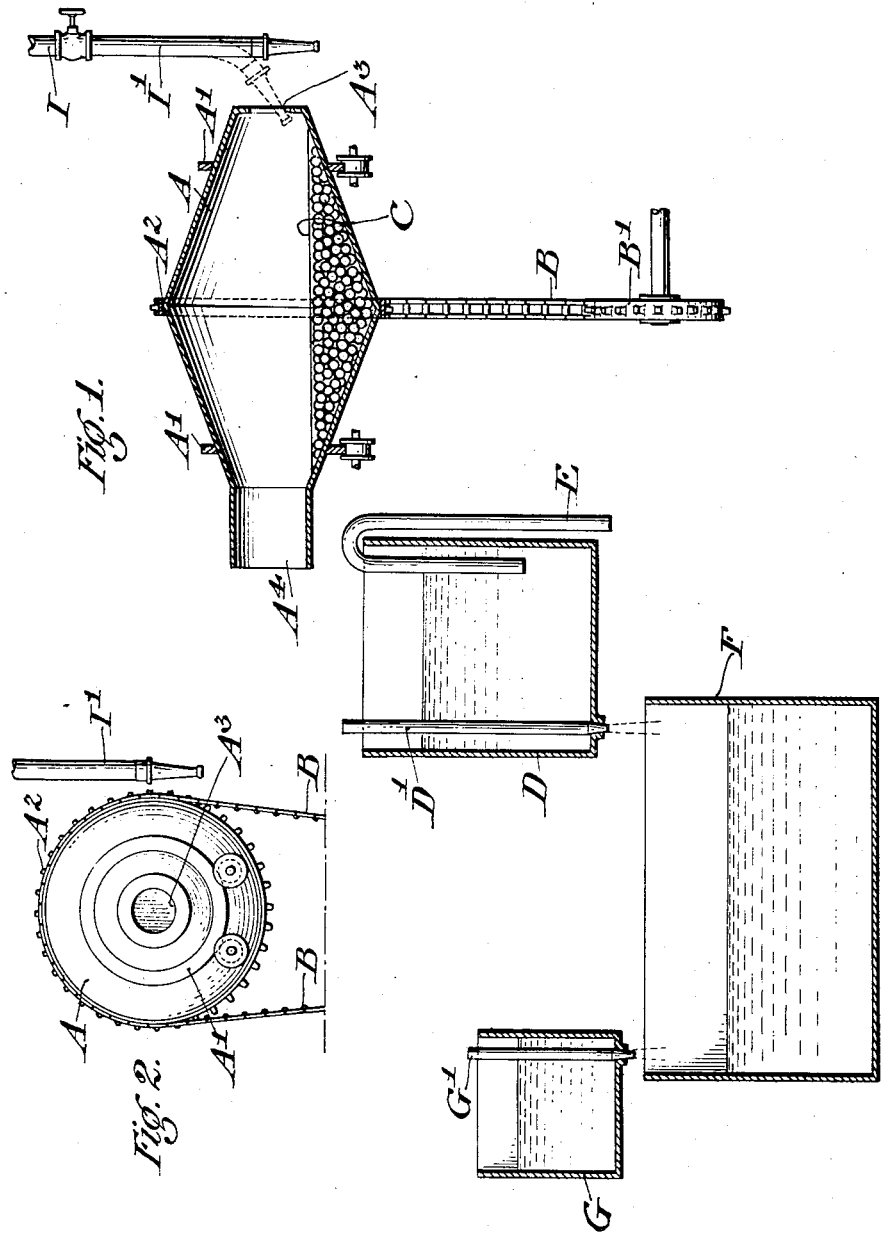
Witnesses:
Inventor:

UNITED STATES PATENT OFFICE.

LOUIS S. HUGHES, OF CHICAGO, ILLINOIS, ASSIGNOR TO PICHER LEAD COMPANY, OF JOPLIN, MISSOURI, A CORPORATION OF MISSOURI.

PRODUCTION OF LEAD COMPOUNDS.

1,033,405.

Specification of Letters Patent.

Patented July 23, 1912.

Application filed December 8, 1911. Serial No. 664,648.

*To all whom it may concern:*

Be it known that I, LOUIS S. HUGHES, a citizen of the United States of America, residing in the city of Chicago, in the county of Cook and State of Illinois, have invented a certain new and useful Improvement in the Production of Lead Compounds, of which the following is a true and exact description, reference being had to the accompanying drawings, which form a part thereof.

The present invention relates to the production of certain lead compounds such as lead hydrate, litharge, and minium, and lead carbonate, arsenate, nitrate, chromate and similar lead salts, and particularly to the conversion of lead sulfate into such compounds.

The general object of the invention is to provide a novel process by means of which the desired lead compounds may be produced of a desirable purity and at a relatively low cost of manufacture. Factors contributing to the relatively low cost of manufacture characterizing my process are: the inherent simplicity of the process and the ease and rapidity with which it may be carried out; the economy in the cost of reagents employed; and the low cost of the lead containing raw materials which my process permits me to use in an effective manner.

In carrying out my invention in the preferred manner I convert lead sulfate into lead hydroxid, which in some cases, is the ultimate product of the process and in other cases is an intermediate product thereafter converted into other compounds, as hereinafter specified; and my invention consists in part, in the novel method which I have devised for converting lead sulfate into lead hydroxid, and in part in the novel and economical mode of converting lead sulfate, and particularly furnace fumes containing lead sulfate, into various compounds of lead by first converting the lead sulfate into hydroxid of lead and then treating the lead hydroxid with suitable reagents to produce the ultimate compounds desired.

In the preferred manner of converting lead sulfate into lead hydroxid I first place the lead sulfate and an alkaline base in a grinding mill, adding a small quantity of water to the mixture, and then thoroughly triturate the mass. By triturating the wet mixture of lead sulfate and the alkaline base in this manner I obtain a thorough and rapid conversion of the lead sulfate and the alkaline base into lead hydroxid and sulfate of the alkaline base. Such a conversion I have found cannot be obtained by simple digestion or boiling accompanied by ordinary stirring of a wet mixture of lead sulfate and the alkaline base, the failure being due, I believe, to the fact that the particles or kernels of the lead sulfate, even though very minute, become coated with crusts or layers of lead hydroxid which protect the bodies of the particles against further action by the alkaline base. By thorough trituration in a suitable grinding mill, and by preference I use a double cone ball mill of well-known type, employing pebbles or metal balls; crusts or coatings of lead hydrate are successively formed on and rubbed off of each kernel of the lead sulfate until finally the entire kernel is converted. After the conversion is completed the mixture of lead hydroxid and sulfate of the alkaline base is run out of the mill, and the sulfate of the base, and lead hydrate are separated in a suitable manner.

One of the advantages characteristic of the process is the relatively small amount of the alkaline base which may be effectively employed to convert the lead sulfate into lead hydroxid. For instance, when caustic soda, *i. e.* sodium hydroxid, is employed as the alkaline base, I find it necessary to add to the lead sulfate only slightly more than the theoretical amount of the sodium hydroxid to effect the conversion.

While lead sulfate from any source may be employed as the raw material out of which the lead hydroxid is to be made, it is one of the advantages of my invention that I am able to use as a satisfactory raw material the furnace fume recovered in the screen system of lead smelting and refining plants, and in particular the furnace fume known as "blue fume", recovered from open hearth lead smelting plants. This fume, as collected, contains some sulfids and carbons, readily burned out, and the burned blue fume is, I believe, essentially a mixture of about fifty-five per cent. of lead sulfate, (though the sulfate may vary from forty-five to sixty per cent.) and about forty-five per cent. of lead oxid. This fume forms a desirable raw product to be used in carrying out my process, not only because it is cheap, but also because of its production by volatilization it is free from the usual non-volatile metallic impurities and oxids which exist in commercial litharge heretofore ordinarily employed in the production of many of the compounds ultimately formed by, or out of the products resulting from my process. In some cases this fume contains a small amount of zinc oxid, but this, while not desirable, has no unfavorable influence upon my process.

When treating burned blue fume with sodium hydroxid in a suitable grinding mill, I add to each one hundred pounds of the burned blue fume about fourteen pounds of sodium hydroxid and about forty-five pounds of water. The sodium hydroxid should be put into the grinding mill in a dry form, as the great heat generated by the solution of the sodium hydroxid in water adds to the effectiveness of the reaction. After the wet mixture has been triturated in the grinding mill and conversion of the lead sulfate into lead hydroxid has been effected, water is run into the mill to flush out the contents; and it is essential that the additional water be added before the operation of the mill be stopped, because the small amount of water added before trituration, as above specified, is insufficient to hold all of the sodium sulfate in solution. In consequence, the sodium sulfate tends to set or crystallize into a hard cake almost instantly if the mill be stopped before the additional water is run in, although so long as the mill is kept in continual operation no difficulty is experienced from the presence of undissolved sodium sulfate. The described use of the relatively small percentage of water before trituration of the sodium hydroxid and lead sulfate mixture worked in the grinding mill is necessary to obtain the concentration of the sodium hydroxid solution desirable, particularly when an economical use of sodium hydroxid is desired. The material washed out of the grinding mill at the end of the triturating operation, as above described, is collected in a suitable washing vat, and the sodium sulfate is separated from the insoluble residue of lead hydroxid and any unconverted lead oxid by decantation, and the lead hydroxid, and lead oxid, if any, are then available for use in the same vat, or preferably in a second vat, for conversion into other lead compounds by the addition of suitable reagents, or the lead hydroxid and lead oxid, if any, may be dried and used without further changes for many purposes.

Instead of caustic soda, other alkaline bases may be employed for converting lead sulfate into lead hydroxid; for instance, I may use potassium hydrate, or I may use quick lime, (calcium oxid) which first changes to calcium hydrate by taking up water and then acts like caustic soda. Quick lime would be the cheapest and most available alkaline base under ordinary circumstances, but for the fact that the resulting calcium sulfate is difficulty soluble in water, thus making necessary more complex, or at least different provisions for separating it from the lead hydroxid than are necessary for separating the lead hydroxid from a readily soluble alkaline sulfate. Magnesia (MgO) may be employed, but is not available for general use. The magnesia acts like lime; in that the addition of the water converts it into magnesium hydrate; but magnesium sulfate unlike calcium sulfate, is readily soluble in water. With magnesia as the alkaline base employed, however, it will usually be found necessary to heat the mill as by means of a steam jet.

With burned blue fume as the lead containing constituent employed, the oxid compound thereof is largely, I believe, if not entirely, converted into lead hydrate in the grinding mill. This conversion is due, I believe, merely to direct absorption of water, as the great fineness of the oxid in the blue fume causes it to be highly reactive. When the blue fume is treated with caustic soda, as above described, the reactions occurring in the mill are as follows:

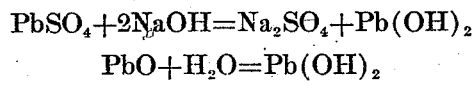

$$PbSO_4 + 2NaOH = Na_2SO_4 + Pb(OH)_2$$
$$PbO + H_2O = Pb(OH)_2$$

For many purposes, as in the formation of lead compounds by said treatments, the presence of a small quantity of lead oxid in the lead hydroxid is not particularly objectionable. Lead oxid and lead hydroxid are both converted by the same acid reagents into the same lead salts of such acids, although the production of lead salts from lead oxid generally requires the use of a greater quantity of reagent material than when lead hydrate is the lead compound converted. Lead hydrate either when mixed with lead oxid or when free from lead oxid, as it is when made in accordance with my process from lead sulfate free from lead oxid, is capable of use in many ways. In general it may be said the lead hydrate or a mixture of lead hydrate and lead oxid may be used wherever litharge has heretofore been employed, and is more desirable for most of such uses than litharge because of the greater reactivity of the lead hydrate permits of a greater economy in the use of reagents. Some examples of the manner in which lead hydrate may be advantageously employed in the production of other lead compounds are the following: Lead arsenate can be made by changing the theoretically required amount of white arsenic or arsenious anhydrid ($Ao_2O_3$) into arsenic acid by digestion with a slight excess of nitric acid and then adding lead hydrate and preferably also a little alkali. On heating, the mixture yields a pure and very desirable lead arsenate. The cost of producing lead arsenate in this manner is substantially less than the cost of manufacturing it by the method heretofore practiced, namely, forming sodium arsenate and lead acetate and mixing their solutions.

Lead carbonate may be formed from lead hydrate by the addition of a soluble carbonate or preferably by treatment with the carbonic anhydrid obtained by burning coke. The lead carbonate obtained from lead hydrate made as hereinbefore specified is better than the carbonate which can be made from lead hydrate formed by hydrating pig-lead, since it does not contain the non-volatile impurities found in pig-lead and in the carbonate produced from hydrated pig-lead. Litharge can be produced from lead hydrate by baking the lead hydrate and the litharge thus produced has the advantage that it is quantitatively free from lead and is exceedingly low in silver, a desideratum for the grade of litharge used by assayers. Red lead, or rather the more desirable "orange mineral" can be made by first baking lead hydrate to convert it into litharge and then roasting the litharge to form minium.

Lead hydrate forms the most advantageous material out of which to make the various lead salts such as lead nitrate, lead acetate, etc., and it is peculiarly useful in the manufacture of lead chromate. In the manufacture of lead chromate, I add to the lead hydrate in a precipitating vat the necessary acid or acids and the required amount of chromate solution, preferably a sodium bichromate solution. Various acids may be employed; acetic, nitric and hydrochloric acids or mixtures of these acids being the most available. The lead hydrate is so highly reactive that very little more acid need be employed than is theoretically required to support the reaction. It is quite unnecessary to add sufficient acid to entirely dissolve the lead hydrate treated. The reactions when the lead hydrate is treated with acetic acid and sodium bichromate are as follows:

$$Pb(OH)_2 + CH_3-COOH = Pb(OH)CH_3-COO + H_2O.$$

$$2Pb(OH)CH_3-COO + Na_2Cr_2O_7 = 2PbCrO_4 + H_2O + 2NaCH_3-COO.$$

If more acid is employed the first reaction instead of yielding basic lead acetate, $Pb(OH)CH_3-COO$, will yield the neutral acetate $Pb(CH_3-COO)_2$. The lead chromate thus produced is of excellent color and tinctorial strength, while lead chromate produced by the long-known method of adding lead sulfate to a solution of an alkaline chromate, or by analogous methods in which additional reagents are employed to accelerate the reaction, is not satisfactory either in color or tinctorial strength. As distinguished from the ordinary method of manufacturing lead chromate by dissolving litharge in acetic, or like acid, and adding an alkaline chromate, the product of my improved process is at least as good, if not better, and is produced at a substantially lower cost, due first to the decrease in the amount, and consequently the cost of the acid reagent material employed; and in the second place, to the fact that the former process involves the use of a lead constituent to wit, litharge, a finished and purified product of manufacture, while I may advantageously employ such a raw material as blue fume which is a byproduct of lead smelting plants, practically without value except for use as a material out of which pig lead can be made by a resmelting operation, or out of which other commercial products may be formed by complex and relatively expensive treatments.

My invention includes also the conversion of lead sulfate into other compounds of lead by trituration of a mixture of lead sulfate or the sintered lead fume referred to above, with a solution of an alkali salt or a weak acid in a manner similar to that above described for forming lead hydroxid by the use of an alkali base. In practice the only acid which furnishes an alkali salt feasible for this purpose is carbonic acid. I may use as the alkali salt potassium carbonate or sodium carbonate, though the cost of the former practically prohibits its use. When a mixture of lead sulfate and sodium carbonate is treated in accordance with the present invention an exchange of bases is effected in general accordance with the following equation:

$$PbSO_4 + Na_2CO_3 = PbCO_3 + Na_2SO_4.$$

The lead carbonate formed is, in general, however, not the simple neutral carbonate indicated by the foregoing reaction equation, but is a mixture of complex basic carbonates with or without the addition, under some circumstances, of neutral carbonate. In forming lead carbonate in this manner the operation is exactly analogous to that already described for the formation of lead hydroxid. The water added to the mixture treated in the grinding mill should be only sufficient to give the mixture the consistency of a thin paste during the triturating stage. The same necessity exists for flushing out the grinding mill before interrupting this operation in order to prevent the mass from settling, as in forming the hydrate. The exchange of bases and the dissolving of the sodium sulfate formed is continuous and progressive and may readily be made complete though it is impossible from a practical standpoint to effect such an exchange of bases by simple digestion or boiling accompanied by ordinary stirring of a mixture of lead sulfate and an alkali salt, such as sodium carbonate, because of the kernel formation described in connection with the hydroxid formation. As the solution of sodium carbonate in water is not an exothermic action it is best in this case to employ either hot water or to heat the mill during grinding.

When lead sulfate is treated with sodium carbonate, as described, a very pure lead carbonate results. This can be used as lead carbonate, or can be employed in forming other lead compounds; since lead carbonate is readily dissolved by the various acids ordinarily employed in forming lead compounds out of lead hydrate. Similarly, when the lead containing substance treated with sodium carbonate or like reagent is the sintered fume byproduct of lead smelting operations the resultant product is a mixture of lead carbonate, lead hydrate and lead oxid, which can be used practically in all of the ways suggested above for the use of the mixture of lead hydrate and lead oxid formed by treating the sintered fume with an alkali base.

With slight modifications of the treatments described, lead sulfate, such as is known under the name of "lead bottoms", and also fumes from lead pigment furnaces, may be employed in practising my invention in lieu of lead sulfate or the burned blue fume, which from a practical standpoint, I prefer to employ as raw material in most cases. The burned blue fume which I have referred to as a variable mixture of lead sulfate and lead oxid is considered by some to be composed of, or to contain lead oxysulfate. This difference in terminology or view point obviously does not affect the use or utility of my invention which may be employed in treating any lead sulfate or lead sulfate containing material, and by the term lead sulfate I mean to include oxysulfate of lead. The burned blue fume is an especially desirable raw material as hereinbefore explained on account of its comparative cheapness and its freedom from certain non-volatile impurities. This last characteristic is also shared by the white fume or sublimed lead from lead pigment furnaces, which, while otherwise an entirely satisfactory raw material, is ordinarily more expensive, however, than the blue fume and hence is economically a less satisfactory raw material than the latter.

For a better understanding of my invention I have illustrated in a somewhat diagrammatic way in the accompanying drawings apparatus adapted for the practical carrying out of a preferred form of my invention.

Of the drawings, Figure 1 is a diagrammatic plan, and Fig. 2 is a transverse elevation of a portion of the apparatus shown in Fig. 1.

In the drawings, A, represents the shell of a double cone ball mill of a familiar type provided with external guiding ribs $A'$ mounted on the grooved supporting wheels $A^5$ and rotated in any usual or suitable manner, as by means of the central gear wheel $A^2$, sprocket chain B and driving gear $B'$. The mill has the charging aperture $A^3$ at one end of smaller diameter than the diameter of the discharge neck $A^4$ at the other end. The ball mill is charged in practice about the level C, and in practically carrying out my invention I have employed apparatus so proportioned that the charge filling the ball mill to the level C will weigh about four hundred pounds, exclusive of the weight of the steel balls or pebbles employed in the mill. After the mill is charged and enough water is added to give the charge the consistency of a thin paste the mill is rotated until the charge is thoroughly triturated and the conversion effected. The exact time required for the purpose is dependent upon various factors; but in triturating a mixture of sodium hydroxid and sintered blue fume in apparatus of this character I have found fifteen minutes sufficient for the trituration operation. Water is introduced into the grinding mill as required through the supply conduit I, shown as comprising a flexible hose section normally hanging at the side of the opening $A^3$ so as not to be in the road during the charging operation.

After the conversion is substantially completed, water is passed into the mill through the hose section $I'$ to thoroughly flush out the contents without interrupting the rotation of the mill, which is continued until the mill is thoroughly washed out. This thoroughly dissolves the alkali sulfate, and the latter, with the lead oxid and hydroxid carried along by the current, flows out of the mill through the neck $A^4$ and discharges into the vat D, which, in practice, I have found it convenient to make of wood; and with a mill of the size specified above, of a capacity of about nine hundred gallons. In the vat D the lead hydroxid and lead oxid settle to the bottom and the sodium sulfate solution may be removed by decantation.

In practice I usually employ a siphon as indicated at E for carrying off the sulfate. It will be understood that water may be thereafter added and the mass agitated and the water then removed to wash the lead compound in the vat D to the necessary extent. The washed lead compounds may then be removed for further treatment, but, in practice, when these lead compounds are to be dissolved in acid, I preferably add the acid in the vat D, especially as this affords a convenient opportunity for filtering the contents of the vat D after the addition of solvent acids, in case this is necessary. After the lead compounds are dissolved in vat D, I pass the solution into the vat F, as by removing the plug valve D'. The vat F, with the proportions of other parts indicated above, may well have a capacity of two thousand gallons and, like the vat D, be formed of wood. In forming lead chromate or other reagent by the addition of a chromate or bichromate solution to the lead compound in the vat F, I prefer to employ a reagent containing vat G located above the vat F and so disposed with respect to the latter that the chromate or bichromate solution or other reagent may flow into the vat F on the removal of the plug valve G'. From the vat F the final solution may be pumped or otherwise passed into a suitable filter press.

The apparatus described may be employed in the manner above described for treatment of lead sulfate or sintered fume with sodium carbonate, the sodium carbonate being added in quantity only slightly in excess of the theoretical amount necessary to effect the conversion of the lead sulfate.

It is to be understood that the apparatus disclosed forms but one of many types of apparatus which may be employed in carrying out my invention, and that the disposition and proportioning of parts indicated are given for the purpose of illustration merely, and may be substantially changed without a real departure from my invention. I believe, however, that from a practical standpoint a ball mill of the general kind illustrated is the only type of grinding mill suitable for the efficient and economical carrying out of the triturating step of my invention.

Having now described my invention, what I claim as new and desire to secure by Letters Patent, is:

1. The method of converting lead sulfate into a different lead compound which consists in triturating a mixture of lead sulfate, an alkali compound and water sufficient to give the mixture the consistency of thin paste to effect an exchange of bases and thereafter adding water to the mixture to effectually dissolve all of the sulfate of the alkali formed.

2. The method of forming lead hydroxid out of lead sulfate which consists in triturating a wet mixture of lead sulfate and an alkaline base to convert the mixture into lead hydrate and a sulfate of the alkaline base, and then separating the last mentioned material from the lead hydrate.

3. The method of producing lead hydrate from lead sulfate which consists in thoroughly triturating a mixture of lead sulfate and a concentrated solution of an alkaline base in a grinding mill to convert the mixture into lead hydrate and sulfate of the alkaline base and then adding water to the mass while continuing the operation of the mill to thereby flush out the mill and prevent the converted mixture from crystallizing therein.

4. The method of converting lead sulfate into lead hydroxid which consists in triturating the lead sulfate admixed with an alkaline base, the sulfate of which is soluble, to thereby convert the mixture into lead hydrate and sulfate of said base, adding water to the mixture prior to trituration in amount sufficient to effect conversion, but insufficient to effectually dissolve all of the sulfate of the base formed, and after the conversion is effected, adding water sufficient in amount to thoroughly dissolve the sulfate formed, and then separating the sulfate from the lead hydrate by decantation.

5. The method of treating lead sulfate containing furnace fumes of smelting and refining plants which consists in converting the lead sulfate contained in said fumes into lead hydroxid, separating out the lead hydroxid and any unconverted lead oxid residue and then converting them into the desired commercial lead compounds.

6. The method of treating blue fume which consists in acting on it with an alkaline base to convert the lead sulfate contained in the blue fume into lead hydrate and then treating the lead hydrate and any residue of lead oxid with an acid reagent and a chromate solution to thereby produce lead chromate.

7. The method of treating burned blue fume which consists in triturating the fume admixed with an alkaline base, the sulfate of which is soluble, to thereby convert the lead sulfate formed into lead hydrate with a corresponding production of sulfate of said base, adding water to the mixture prior to trituration in amount sufficient to effect the conversion, but insufficient to effectually dissolve all of the sulfate of the base formed, and after the conversion is effected and before the trituration operation is stopped, adding water in amount sufficient to thoroughly dissolve the sulfate of the base, and then separating the lead hydrate from the sulfate of the base by decantation.

8. The economical method of forming lead chromate which consists in triturating burned blue fume admixed with an alkaline base, the sulfate of which is soluble, to thereby convert the mixture into lead hydrate, adding water to the mixture prior to trituration sufficient to effect the conversion but insufficient in amount to effectually dissolve all of the sulfate of the base formed, and after the conversion is effected and before the triturating operation is stopped, adding water to thoroughly dissolve the sulfate formed, separating by decantation the lead hydrate and any unconverted residue of lead oxid from the sulfate formed, and then treating the lead hydroxid and lead oxid residue with an acid reagent and a chromate solution.

9. The economical method of producing purified commercial lead compound which consists in triturating a mixture of the lead sulfate containing furnace fumes of smelting and refining plants with a concentrated solution of an alkaline compound, separating out by washing and decantation the alkaline sulfate formed by the trituration step and adding to the remaining lead compounds reagents to convert them into the compounds desired.

LOUIS S. HUGHES.

Witnesses:
 LOUIS F. GEORE,
 MARY WEIMER.